(12) United States Patent
Dai et al.

(10) Patent No.: US 12,458,528 B2
(45) Date of Patent: Nov. 4, 2025

(54) PURE POLYURETHANE CONDOM HAVING ADHESIVE LAYER, AND PREPARATION METHOD THEREFOR

(71) Applicant: RECKITT BENCKISER HEALTH LIMITED, Slough (GB)

(72) Inventors: Jiabing Dai, Lanzhou (CN); Weihu Li, Suzhou (CN); Linlin Feng, Lanzhou (CN); Liang Chen, Lanzhou (CN)

(73) Assignee: Reckitt Benckiser Health Limited (GB)

( * ) Notice: Subject to any disclaimer, the term of this patent is extended or adjusted under 35 U.S.C. 154(b) by 445 days.

(21) Appl. No.: 17/916,135

(22) PCT Filed: Oct. 22, 2020

(86) PCT No.: PCT/CN2020/122616
§ 371 (c)(1),
(2) Date: Sep. 30, 2022

(87) PCT Pub. No.: WO2021/196569
PCT Pub. Date: Oct. 7, 2021

(65) Prior Publication Data
US 2023/0414401 A1 Dec. 28, 2023

(30) Foreign Application Priority Data

Mar. 31, 2020 (CN) .......................... 202010242233.8
May 20, 2020 (CN) .......................... 202010430499.5
May 20, 2020 (CN) .......................... 202010431395.6

(51) Int. Cl.
*A61F 6/04* (2006.01)
*A61F 6/06* (2006.01)
(Continued)

(52) U.S. Cl.
CPC .............. *A61F 6/04* (2013.01); *A61F 6/065* (2013.01); *A61L 31/06* (2013.01); *A61L 31/10* (2013.01);
(Continued)

(58) Field of Classification Search
CPC .............. A61F 6/04; A61F 2006/044; A61F 2006/048; A61F 5/453; A61F 5/41;
(Continued)

(56) References Cited

U.S. PATENT DOCUMENTS 4,684,490 A 8/1987 Taller et al.
6,389,602 B1 5/2002 Alsaffar

FOREIGN PATENT DOCUMENTS

CN 1969778 A * 5/2007
CN 102078233 A * 6/2011
(Continued)

OTHER PUBLICATIONS

Extended European Search Report dated Apr. 16, 2024 in EP20928568.3, filed Feb. 8, 2023.
(Continued)

*Primary Examiner* — Ophelia A Hawthorne
(74) *Attorney, Agent, or Firm* — Lerner David LLP

(57) ABSTRACT

Disclosed in the present disclosure are a pure polyurethane condom having an adhesive layer, and a method for preparing the condom. The pure polyurethane condom having an adhesive layer at least comprises: a first polyurethane film layer; a polyurethane adhesive layer on the first polyurethane film layer; and a second polyurethane film layer on the polyurethane adhesive layer, wherein the 100% tensile modulus of the polyurethane adhesive layer is 2.5 N/mm² or lower, and the structures of the first polyurethane film layer and the second polyurethane film layer are different from that of the polyurethane adhesive layer.

18 Claims, 3 Drawing Sheets

(51) Int. Cl.
*A61L 31/06* (2006.01)
*A61L 31/10* (2006.01)
*A61L 31/14* (2006.01)
*B29C 33/40* (2006.01)
*B29C 41/14* (2006.01)
*B29C 41/40* (2006.01)
*C09J 175/04* (2006.01)
*B29C 41/22* (2006.01)
*B29K 75/00* (2006.01)
*B29K 105/00* (2006.01)
*B29L 31/00* (2006.01)

(52) U.S. Cl.
CPC .............. *A61L 31/14* (2013.01); *B29C 33/40* (2013.01); *B29C 41/14* (2013.01); *B29C 41/40* (2013.01); *C09J 175/04* (2013.01); *A61F 2006/043* (2013.01); *A61L 2420/02* (2013.01); *A61L 2420/04* (2013.01); *A61L 2420/08* (2013.01); *B29C 41/22* (2013.01); *B29K 2075/00* (2013.01); *B29K 2105/0097* (2013.01); *B29L 2031/7538* (2013.01)

(58) Field of Classification Search
CPC ...... A61F 2005/414; A61F 6/00; A61F 6/065; A61F 6/02; A61F 2005/411; A61F 6/06; A61F 13/471; A61F 13/82; A61H 19/32; A61H 2201/105; A61H 2201/169; Y10S 128/918; A61L 31/10; A61L 31/14
See application file for complete search history.

(56) References Cited

FOREIGN PATENT DOCUMENTS

| | | | | |
|---|---|---|---|---|
| CN | 103692733 | A | 4/2014 | |
| CN | 106273142 | A * | 1/2017 | ............. B29C 33/58 |
| CN | 107057129 | A | 8/2017 | |
| CN | 109160990 | A | 1/2019 | |
| CN | 109160996 | A | 1/2019 | |
| CN | 111658288 | A | 9/2020 | |
| CN | 111138614 | A | 10/2020 | |
| CN | 111743680 | A | 10/2020 | |
| EP | 0147072 | A1 * | 11/1984 | |
| JP | 07256665 | A * | 10/1995 | |
| JP | 2000342616 | A * | 12/2000 | |
| JP | 4497755 | B2 * | 7/2010 | |
| KR | 20190072511 | A * | 9/2017 | ........... C09D 107/02 |

OTHER PUBLICATIONS

International Search Report and Written Opinion received in corresponding PCT Application No. PCT/CN2020/122616 mailed Jan. 20, 2021 with English translation (10 pages total).

\* cited by examiner

PURE POLYURETHANE CONDOM HAVING ADHESIVE LAYER, AND PREPARATION METHOD THEREFOR

CROSS-REFERENCE TO RELATED APPLICATIONS

This application is a U.S. National Phase of International Patent Application No. PCT/CN2020/122616, filed on 22 Oct. 2020, which claims priority to CN application No. 202010242233.8 filed 31 Mar. 2020, CN application No. 202010430499.5 filed 20 May 2020, and CN application No. 202010431395.6 filed 20 May 2020. The entire contents of these applications are incorporated herein by reference in their entirety.

TECHNICAL FIELD

The present disclosure relates to the field of condom materials, and in particular, to a pure polyurethane condom having an adhesive layer and a method for preparing the condom.

BACKGROUND ART

Condoms are simple devices widely used in the world for contraception and prevention of sexually transmitted diseases. The current condom products mainly include natural rubber latex condoms and waterborne polyurethane condoms.

At present, it is difficult to make the thickness of natural rubber latex condoms be 0.04 mm or less because of the material characteristics of natural latex. Meanwhile, natural latex contains a variety of proteins, which pose a safety risk to people having an allergy to proteins. With the improvement of living standards, consumers of condoms not only require the basic contraception function, but also demand a better user experience. Polyurethane condoms, as a new product in the market in recent years, have a thin thickness due to materials improvement, providing the consumers with a more realistic and pleasant experience during use. However, the flexibility of polyurethane is poorer than natural rubbers.

Nevertheless, it is difficult for a single polyurethane resin to be ideal in flexibility, burst property, water resistance, and strength. Therefore, it is of great significance to provide a new condom product having an optimal performance and meeting the market demands.

SUMMARY OF THE INVENTION

The present invention is made in view of the above-described drawbacks in the prior art. One of the objectives of the present disclosure is to provide a pure polyurethane condom having an adhesive layer, which is prepared by using resins with different properties and an adhesive layer for laminating, thereby achieving optimal performances in flexibility and strength, so as to meet the market demand for the product.

Another objective of the present disclosure is to provide a method for preparing the pure polyurethane condom having an adhesive layer as described above, which will be described in more detail hereinafter.

The present disclosure provides a pure polyurethane condom having an adhesive layer, comprising at least a first polyurethane film layer; a polyurethane adhesive layer on the first polyurethane film layer; and a second polyurethane film layer on the polyurethane adhesive layer, wherein the polyurethane adhesive layer has a 100% tensile modulus of 2.5 N/mm$^2$ or lower, and the first polyurethane film layer and the second polyurethane film layer each have a structure different from that of the polyurethane adhesive layer.

In one embodiment, the pure polyurethane condom has a thickness of 0.001 mm to 0.04 mm.

In one embodiment, the pure polyurethane condom has a burst pressure of 1 kPa or more, and/or a burst volume of 5 L or more.

In one embodiment, the first polyurethane film layer has a tensile strength of 25 MPa or more.

In one embodiment, the first polyurethane film layer has a 100% tensile modulus of 3.5 N/mm$^2$ or lower.

In one embodiment, the first polyurethane film layer has an elongation at break of 500% or more.

In one embodiment, the first polyurethane film layer has a tensile strength retention of 60% or more after being immersed in water at 30° C. to 60° C. for a period of 0.1 h to 1 h.

In one embodiment, the first polyurethane film layer has a burst pressure of 1.0 kPa or more when it is formed into a condom of 10-25 μm.

In one embodiment, the first polyurethane film layer has a burst volume of 5 L or more when it is formed into a condom of 10-25 μm.

In one embodiment, the first polyurethane film layer has a thickness of 0.1-20 μm.

In one embodiment, there is at least one polyurethane adhesive layer, and each polyurethane adhesive layer has a thickness of 0.1-20 μm.

In one embodiment, the polyurethane adhesive layer is any one selected from anionic, cationic, nonionic, and amphoteric waterborne polyurethanes, or solvent-based and solvent-free polyurethanes, or any combination thereof.

In one embodiment, the polyurethane is any one of polyether-based, polyester-based, and polyether-polyester hybrid polyurethane resins, or any combination thereof.

In one embodiment, the anionic waterborne polyurethane is carboxylic acid-based, sulfonic acid-based, or a mixture of both.

In one embodiment, the pure polyurethane condom further comprises: a third polyurethane film layer on the second polyurethane film layer, wherein the third polyurethane film layer has a structure different from that of the second polyurethane film layer.

In one embodiment, the first polyurethane film layer has a tensile strength of 25 MPa or more, the second polyurethane film layer has a tensile strength of 25 MPa or more, and the third polyurethane film layer has a 100% tensile modulus of 3.5 N/mm$^2$ or lower.

The present disclosure also provides a pure polyurethane condom having an adhesive layer, comprising at least a first polyurethane film layer; a first polyurethane adhesive layer on the first polyurethane film layer; a second polyurethane film layer on the first polyurethane adhesive layer; a second polyurethane adhesive layer on the second polyurethane film layer; a third polyurethane film layer on the second polyurethane adhesive layer; and a fourth polyurethane film layer on the third polyurethane film layer, wherein the first polyurethane film layer, the second polyurethane film layer, and the fourth polyurethane film layer each have a structure different from that of the first polyurethane adhesive layer; the first polyurethane adhesive layer and the second polyurethane adhesive layer have the same structure, and have a 100% tensile modulus of 2.5 N/mm$^2$ or lower; the first polyurethane film layer and the third polyurethane film layer have the same structure, and have an elongation at break of 500% or more; the second polyurethane film layer has a 100% tensile modulus of 3.5 N/mm² or lower; and the fourth polyurethane film layer has a burst volume of 5 L or more when it is formed into a condom of 10-25 µm.

The present disclosure provides a method for preparing the pure polyurethane condom having an adhesive layer, comprising at least the following steps:

dipping in a first polyurethane resin and drying to form a first polyurethane film layer;

dipping in a polyurethane adhesive layer resin and drying to form a polyurethane adhesive layer on the first polyurethane film layer;

dipping in a second polyurethane resin and drying to form a second polyurethane film layer on the polyurethane adhesive layer;

dipping in a release agent to apply it on the second polyurethane film layer, followed by drying, demolding, and electrical testing to obtain the polyurethane condom; wherein the polyurethane adhesive layer has a 100% tensile modulus of 2.5 N/mm² or lower, and the first polyurethane film layer and the second polyurethane film layer each have a structure different from that of the polyurethane adhesive layer.

In one embodiment, the dipping in a first polyurethane resin is carried out by dipping a mould composed of glass or a thermoplastic polymer in the first polyurethane resin.

The pure polyurethane condom having an adhesive layer provided according to the present disclosure is composed of pure polyurethane and prepared by using a waterborne polyurethane having a low modulus and high adhesiveness as an adhesive layer, and laminating polyurethane film layers having the same property or different properties together via the adhesive layer to make a composite article. The pure polyurethane condom provided according to the present disclosure makes full use of the respective performance advantages of the polyurethane material of each layer, and effectively adjusts various properties of the condom product, such as flexibility and strength, so as to achieve optimization of performance and meet the market demand for the product. In addition, the present disclosure uses a formulation having a low cost and employs dip moulding which is a simple, safe, and environmentally friendly moulding process. Other features, benefits, and advantages will be apparent from the disclosure detailed herein, including the description and claims.

DESCRIPTION OF THE DRAWINGS

The drawings used in the embodiments will be briefly described below to more clearly describe the technical solutions in the embodiments of the present disclosure. It is to be understood that the following drawings depict only certain embodiments of the invention and are therefore not to be considered limiting its scope. For a person of ordinary skill in the art, other relevant drawings can also be obtained according to these drawings without paying any inventive effort.

DETAILED DESCRIPTION OF THE INVENTION

Figure 1:
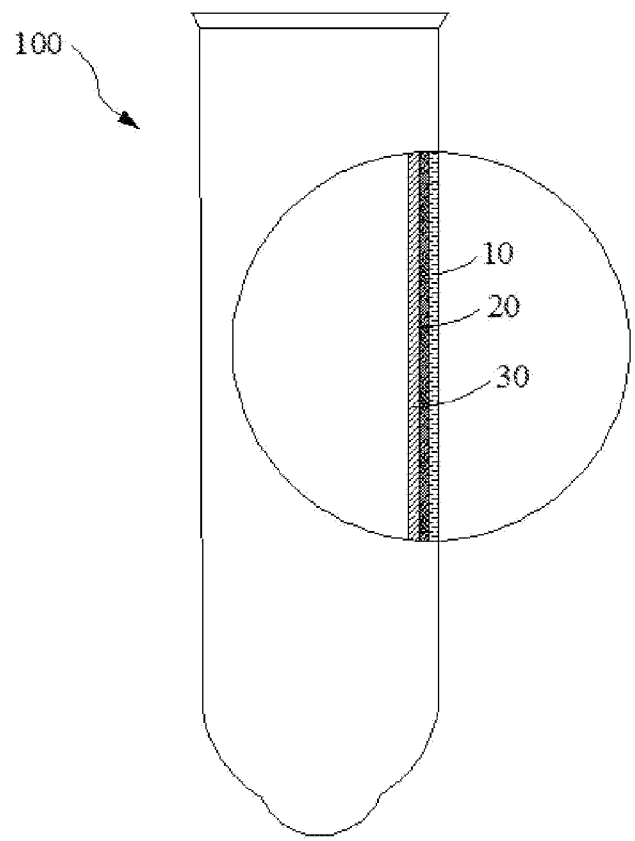
FIG. 1 illustrates a schematic structure of the polyurethane condom having an adhesive layer according to one specific embodiment of the present disclosure.

The technical solutions of the embodiments in the present disclosure will be clearly and fully described with reference to the accompanying drawings, in order to provide a clear understanding of for the objectives, technical solutions and advantages of the embodiments of the present disclosure. Obviously, it is to be understood that the described embodiments are part of, and not all of, the present disclosure. The components of the embodiments in the present disclosure, which are generally described and illustrated in the drawings herein, can be configured and designed upon different needs.

As shown in FIGS. 1-5, the present disclosure provides a polyurethane condom 100, which is made of materials comprising polyurethane, has high strength, high compactness, and good biocompatibility, may have a thickness of for example 0.001 mm to 0.04 mm, such as 0.01 mm, 0.015 mm, 0.019 mm, 0.028 mm and 0.035 mm, can provide a user with a more comfortable experience and a softer and more delicate skin feel, and may have a strength, e.g., tensile strength, of 30 MPa or more, preferably 40 MPa or more, without the problem of allergy caused by natural latex condoms.

The polyurethane condom 100 having a thickness within the above range has a burst pressure of for example 1 kPa or more, preferably 3 kPa or more, for example, 3 kPa, 4 kPa, or 5 kPa, and a burst volume of for example 5 L or more, for example, 8 L, 12 L, or 18 L.

The polyurethane condom 100 may have a strength, e.g. tensile strength, of for example 30 MPa or more, preferably 40 MPa or more, and a 100% modulus of for example 2.5 N/mm² or lower, such as 2 N/mm², 1.8 N/mm², 1.5 N/mm², or 1 N/mm².

Figure 2:
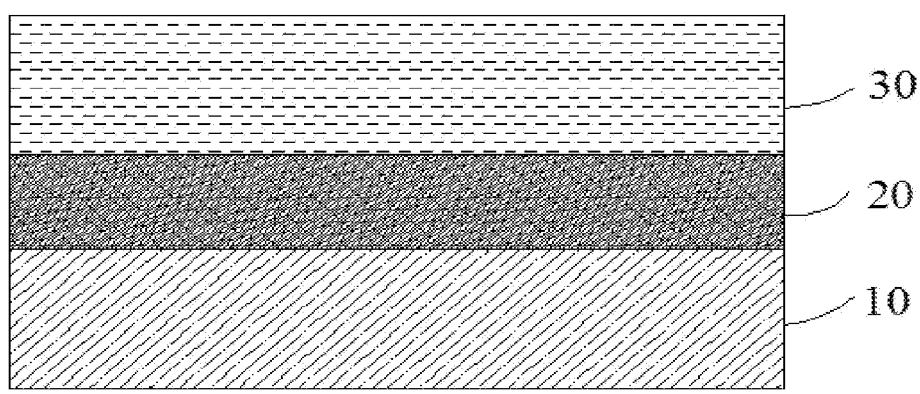
FIG. 2 illustrates a schematic view of the layered structure of the polyurethane condom of FIG. 1.

As shown in FIGS. 1 and 2, the present disclosure provides a specific embodiment of the polyurethane condom 100, which may be composed of a multi-layer structure, such as 3-layer, 4-layer, 5-layer, 6-layer, etc. but not limited thereto, as adjustable according to actual needs. Here the polyurethane condom 100 is configured as a male condom, but it should be understood that it may also be configured as a female condom, or other heterotypic condoms and the like. Any polyurethane condom 100 product comprising the layered configuration of the present disclosure should fall within the scope of the present disclosure.

The polyurethane condom 100 provided according to the present disclosure is made of a pure polyurethane material, wherein a waterborne polyurethane having a low modulus and high adhesiveness is used as an adhesive layer, and polyurethane film layers having the same property or different properties on the opposite sides of the adhesive layer are bound together to make a composite article, thereby making full use of the performance advantages of the polyurethane material of each layer, and effectively adjusting various properties of the condom product, such as flexibility and strength, so as to achieve optimization of performance.

As shown in FIGS. 1 and 2, the polyurethane condom 100 includes a first polyurethane film layer 10, a polyurethane adhesive layer 20, and a second polyurethane film layer 30. The first polyurethane film layer 10 may serve as the innermost layer of the polyurethane condom 100, contacting the skin during use; or may certainly serve as the outermost layer, as adjustable according to actual needs.

As shown in FIG. 2, the first polyurethane film layer 10 may be a layer formed of a polyurethane resin, or a layer formed of an emulsion of the polyurethane resin mixed with other auxiliary agents. The auxiliary agents may be, for example, functional auxiliary agents such as a lubricant, a bactericide, a thickener, a wetting agent, an antifoaming agent and the like, but not limited thereto. The polyurethane resin may be any suitable kind of aliphatic polyurethane or aromatic polyurethane, and may be preferably, for example, an anionic, cationic, nonionic, or amphoteric waterborne polyurethane, and may also be a solvent-based or solvent-free polyurethane. The raw materials and preparation process for the polyurethane may be adjusted to prepare a desired polyurethane.

In some embodiments, the polyurethane resin may have a tensile strength of, for example, 25 MPa or more, preferably 30 MPa or more, for example, 35 MPa, 38 MPa, 40 MPa, 60 MPa or more, so as to form a high-strength polyurethane resin A, from which a first polyurethane film layer 10 formed has a high tensile strength and is not easily damaged.

In some embodiments, the polyurethane resin may have a 100% tensile modulus of, for example, 3.5 N/mm$^2$ or lower, such as 2.5 N/mm$^2$, 2 N/mm$^2$, 1.8 N/mm$^2$, 1.5 N/mm$^2$ and 0.6 N/mm$^2$ or lower, to form a low-modulus polyurethane resin B, from which a first polyurethane film layer 10 formed has good flexibility.

In some embodiments, the polyurethane resin may have an elongation at break of, for example, 500% or more, for example, 600%, 700% or more, preferably 800% or more, for example 830%, 900%, 1000% or more, so as to form a high-ductility polyurethane resin C, from which a first polyurethane film layer 10 formed has high ductility and stretchability.

In some embodiments, the polyurethane resin has a wet-film tensile strength retention of 60% or more, for example, 65% or 75%, after a dry film made thereof is immersed in water at 30° C. to 60° C. for 0.1-1 h, such as in water at 40° C. for 0.5 h, in water at 50° C. for 0.5 h, or in water at 50° C. for 0.6 h, thereby forming a water-resistant polyurethane resin D, from which a first polyurethane film layer 10 formed has good water resistance.

In some embodiments, the polyurethane resin may be used alone to make a condom, and such a condom of 10-25 µm, such as 20 µm or 22 µm, made thereof has a burst pressure of 1.0 kPa or more, for example 2.0 kPa, 3.0 kPa, 4.0 kPa, 5.0 kPa or more, thereby forming a high burst-pressure polyurethane resin E.

In some embodiments, the polyurethane resin may be used alone to make a condom, and such a condom of 10-25 µm, such as 20 µm or 22 µm, made thereof has a burst volume of 5 L or more, for example 8 kPa, 10 kPa, 12 kPa, 15 kPa, 18 kPa or more, thereby forming a high burst-volume polyurethane resin F.

It should be understood that only some properties of the polyurethane resin for the first polyurethane film layer 10 are described here, the properties of the polyurethane resin are certainly not limited thereto, and more properties may be achieved according to actual needs, such as tear resistance, oil resistance, blocking resistance, electric breakdown resistance, etc.

As shown in FIG. 2, the first polyurethane film layer may have a thickness of for example 0.1-20 µm, such as 0.3 µm, 1 µm, 3 µm, 5 µm, or 10 µm.

As shown in FIG. 2, the polyurethane adhesive layer 20 is on the first polyurethane film layer 10, and may be a layer formed of a polyurethane resin, or a layer formed of an emulsion of the polyurethane resin mixed with other auxiliary agents. The auxiliary agents may be, for example, functional auxiliary agents such as a lubricant, a bactericide, a thickener, a wetting agent, an antifoaming agent and the like, but certainly not limited thereto. The polyurethane resin may be any suitable kind of aliphatic polyurethane or aromatic polyurethane, and preferably, for example, an anionic, cationic, nonionic, or amphoteric waterborne polyurethane, or a solvent-based or solvent-free polyurethane. More preferably, the anionic polyurethane is carboxylic acid-based, sulfonic acid-based, or a mixture of both. The raw materials and preparation process for the polyurethane may be adjusted to prepare a desired polyurethane. From the viewpoints of obtaining the adhesion of the adhesive layer and balancing the properties between the first polyurethane film layer and the second polyurethane film layer, the polyurethane resin for the polyurethane adhesive layer 20 is different from the polyurethane resins for the other film layers, and the polyurethane resin is a low-modulus polyurethane material synthesized from a polyether and/or polyester polyol. Since a polyether-based, polyester-based, or polyether-polyester hybrid polyurethane resin is obtained, the polyurethane resin has a good adhesiveness to other polyurethane materials, while still having flexibility and a 100% tensile modulus of, for example, 2.5 N/mm$^2$ or lower, such as 2 N/mm$^2$, 1.8 N/mm$^2$, 1.5 N/mm$^2$, 1.2 N/mm$^2$, 1 N/mm$^2$ or lower.

As shown in FIG. 2, the polyurethane adhesive layer 20 is an intermediate layer which tightly bonds the film layers on its opposite sides. There may be at least one polyurethane adhesive layer 20, e.g. one layer, two layers, three layers, etc. with thin film layers of other materials laminated on both sides of each adhesive layer. The polyurethane adhesive layer 20 may have a thickness of for example 0.1-20 µm, preferably 0.1-10 µm, such as 0.1 µm, 0.3 µm, 1 µm, 2 µm, 3 µm, or 5 µm, in view of obtaining a low-modulus, highly adhesive polyurethane adhesive layer 20 and a polyurethane condom 100 having a desired thickness.

As shown in FIG. 2, the second polyurethane film layer 30 is on the polyurethane adhesive layer 20. The second polyurethane film layer 30 is a layer formed of a polyurethane resin, or a layer formed of an emulsion of the polyurethane resin mixed with other auxiliary agents. The auxiliary agents may be, for example, functional auxiliary agents such as a lubricant, a bactericide, a thickener, a wetting agent, and an antifoaming agent, but certainly not limited thereto.

As shown in FIG. 2, the second film layer 30 may have a thickness of for example 0.1-30 µm, such as 1 µm, 2 µm, 3 µm, 5 µm, 10 µm, 15 µm, or 20 µm, in view of obtaining a polyurethane condom 100 having a desired thickness and desired interlayer adhesion.

In some embodiments, the second polyurethane film layer 30 has a structure the same as that of the first polyurethane film layer 10. For example, the polyurethane resin for the second polyurethane film layer 30 has the same properties as those of the first polyurethane film layer 10. Specifically, for example, the first polyurethane film layer 10 and the second polyurethane film layer 30 are of the same polyurethane resin, both being the high-strength polyurethane resin A, or both being the low-modulus polyurethane resin B, or both being the high-ductility polyurethane resin C, and are bonded via the adhesive layer 20 (for example, the adhesive layer resin is represented by "N"), thereby obtaining a high-strength ANA-layer-structure polyurethane condom 100, or a flexible BNB-layer-structure polyurethane condom 100, or a high-ductility CNC-layer-structure polyurethane condom 100, respectively. In addition, for example, the second polyurethane film layer 30 and the first polyurethane film layer 10 may have the same thickness, for example, a thickness of 10 µm, 15 µm, or 20 µm. The present invention is certainly not limited thereto.

In other embodiments, the second polyurethane film layer 30 has a structure different from that of the first polyurethane film layer 10. For example, the polyurethane resin for the second polyurethane film layer 30 may have properties different from those of the first polyurethane film layer 10. Specifically, for example, the polyurethane resin for the first polyurethane film layer 10 is a high-strength polyurethane resin A, and the polyurethane resin for the second polyurethane film layer 30 is a low-modulus polyurethane resin B, and they are bonded via the adhesive layer 20 to obtain a polyurethane condom 100 having an ANB layer structure having both high strength and flexibility. For another example, the polyurethane resin for the first polyurethane film layer 10 is a high-strength polyurethane resin A, and the polyurethane resin for the second polyurethane film layer 30 is a high-ductility polyurethane resin C, and they are bonded via the adhesive layer 20 to obtain a polyurethane condom 100 having an ANC layer structure having both high strength and high stretchability. For another example, the polyurethane resin for the first polyurethane film layer 10 is a low-modulus polyurethane resin B, and the polyurethane resin for the second polyurethane film layer 30 is a high burst-pressure polyurethane resin E, and they are bonded via the adhesive layer 20 to obtain a polyurethane condom 100 having a BNE layer structure having both high strength and high burst pressure. The present disclosure utilizes the adhesion of the adhesive layer 20 to exert the performance advantages of each of the first polyurethane film layer 10 and the second polyurethane film layer 30, so as to obtain a polyurethane condom with an optimized performance. In addition, for example, the second polyurethane film layer 30 may have a thickness different from that of the first polyurethane film layer 10. For example, the first polyurethane film layer 10 may be 10 µm thick while the second polyurethane film layer 30 may be 15 µm thick; or the first polyurethane film layer 10 may be 15 µm thick while the second polyurethane film layer 30 may be 10 µm thick. The present invention is certainly not limited thereto.

Figure 3:
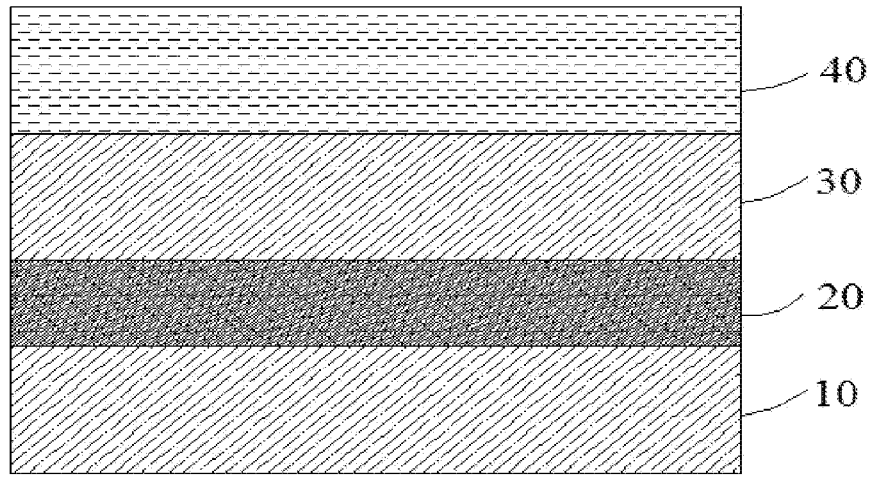
FIG. 3 illustrates a schematic view of the layered structure of the polyurethane condom according to another specific embodiment.

As shown in FIG. 3, the present disclosure further discloses another specific embodiment of the polyurethane condom 100, comprising a first polyurethane film layer 10, a polyurethane adhesive layer 20, a second polyurethane film layer 30, and a third polyurethane film layer 40.

As shown in FIG. 3, the first polyurethane film layer 10, the polyurethane adhesive layer 20, and the second polyurethane film layer 30 may have the same structure as described above, for example.

As shown in FIG. 3, the third polyurethane film layer 40 is on the second polyurethane film layer 30, and the third polyurethane film layer 40 may have a structure different from that of the second polyurethane film layer 30 in view of obtaining a polyurethane condom 100 with desired performances. For example, they may have different properties. Specifically, for example, the second polyurethane film layer 30 is a high-strength polyurethane resin A, and the third polyurethane film layer 40 is a low-modulus polyurethane resin B. In a specific embodiment, for example, the polyurethane condom 100 may be formed to have an ANAB layer structure. For another example, the second polyurethane film layer 30 is a low-modulus polyurethane resin B and the third polyurethane film layer 40 is a high-ductility polyurethane resin C. In a specific embodiment, for example, the polyurethane condom 100 may be formed to have an ANBC layer structure. The present invention is certainly not limited thereto.

Figure 4:
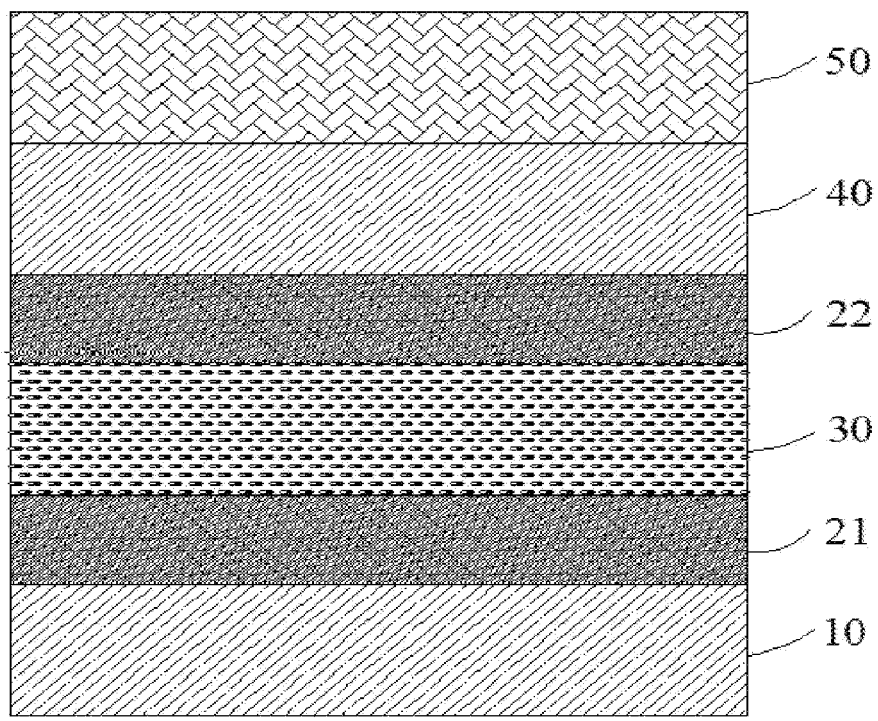
FIG. 4 illustrates a schematic view of the layered structure of the polyurethane condom according to yet another specific embodiment.
Figure 5:
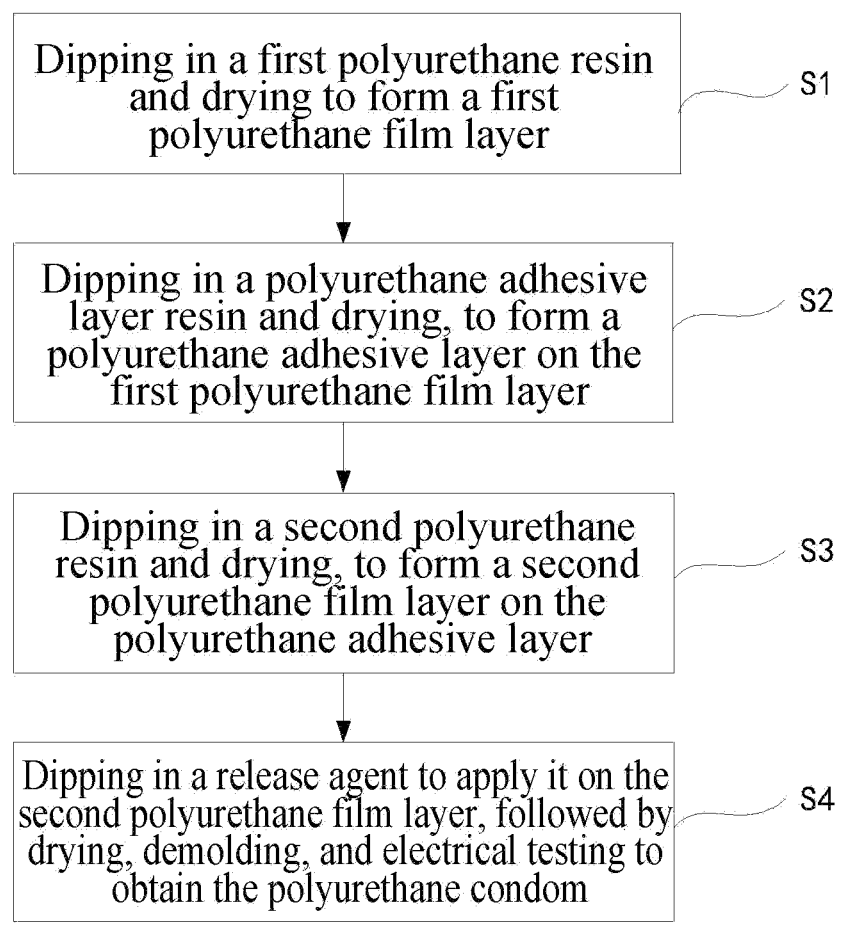
FIG. 5 illustrates a schematic flow diagram of a method for preparing the polyurethane condom having an adhesive layer according to one specific embodiment of the present application.

As shown in FIG. 4, the present disclosure further discloses another specific embodiment of the polyurethane condom 100, comprising a first polyurethane film layer 10, a first polyurethane adhesive layer 21, a second polyurethane film layer 30, a second polyurethane adhesive layer 22, a third polyurethane film layer 40, and a fourth polyurethane film layer 50.

As shown in FIG. 4, the polyurethane adhesive layers include a first polyurethane adhesive layer 21 and a second polyurethane adhesive layer 22, which are, for example, composed of the same resin. On the opposite sides of the first polyurethane adhesive layer 21, the first polyurethane film layer 10 and the second polyurethane film layer 30 are respectively laminated, and on the opposite sides of the second polyurethane adhesive layer 22, the second polyurethane film layer 30 and the third polyurethane film layer 40 are respectively laminated.

As shown in FIG. 4, the first polyurethane film layer 10, the first polyurethane adhesive layer 21, the second polyurethane film layer 30, the second polyurethane adhesive layer 22, and the third polyurethane film layer 40 may have structures the same as those described above, for example. The fourth polyurethane film layer 50 is on the third polyurethane film layer 40, and they have different structures, e.g. different properties. In a specific embodiment, for example, a polyurethane condom 100 may be formed to have a CNBNCF layer structure, wherein the polyurethane adhesive layers 21, 22 are polyurethane having a 100% tensile modulus of 2.5 N/mm$^2$ or lower, such as 1.8 N/mm$^2$; the first polyurethane film layer 10 and the third polyurethane film layer 40 have the same structure, and have an elongation at break of 500% or more, for example 800% or more; the second polyurethane film layer 30 has a 100% tensile modulus of 3.5 N/mm$^2$ or lower, such as 3.2 N/mm$^2$ or lower; and the fourth polyurethane film layer 50 has a burst volume of 5 L or more, such as 7 L or more, when it is formed into a condom of for example 20 µm.

In another specific embodiment, for example, an ANBNCD layer structure may be formed, wherein the polyurethane adhesive layers 21, 22 are a polyurethane resin having a 100% tensile modulus of for example 2 N/mm$^2$; the first polyurethane film layer 10 and the third polyurethane film layer 40 are a polyurethane resin having a tensile strength of 35 MPa; the second polyurethane film layer 30 is a polyurethane resin having a 100% tensile modulus of 3.2 N/mm$^2$; and the fourth polyurethane film layer 50 is a polyurethane resin having a tensile strength retention of 65% after being immersed in water at 50° C. for 0.5 h.

The polyurethane condom may be formed into other layer structures, such as an ANBNC layer structure, a BNANE layer structure, and a DNDNANF layer structure, but not limited thereto. It should be understood that any structure in which a polyurethane adhesive layer 20 is used as an intermediate layer of the polyurethane condom 100 and on the opposite sides thereof polyurethane film layers are laminated should fall within the scope of the present disclosure.

The present disclosure further provides a method for preparing the pure polyurethane condom having an adhesive layer, which comprises, but is not limited to, the following steps S1-S4:

S1. dipping in a first polyurethane resin and drying, to form a first polyurethane film layer;

S2. dipping in a polyurethane adhesive layer resin and drying, to form a polyurethane adhesive layer on the first polyurethane film layer;

S3. dipping in a second polyurethane resin and drying, to form a second polyurethane film layer on the polyurethane adhesive layer;

S4. dipping in a release agent to apply it on the second polyurethane film layer, followed by drying, demolding, and electrical testing to obtain the polyurethane condom.

During steps S1-S4 as described above, for example, a glass mould may be used and the surface of the glass mould is heated to 20° C. to 50° C., e.g. 35° C. or 40° C.; dipped in the first polyurethane resin and dried at for example 80° C. to 120° C., e.g. 90° C., 100° C., or 110° C.; dipped in the adhesive layer polyurethane resin and dried at 70° C. to 110° C., e.g. 80° C., 90° C., or 100° C.; and dipped in the second polyurethane resin and dried at 100° C. to 120° C., e.g. 110° C.; after rolling, the polyurethane condom is dried at 100° C. to 150° C., e.g. 120° C., 135° C. or 140° C., then dipped in the release agent and dried at 75° C. to 95° C., e.g. 78° C., 80° C. or 85° C., followed by demoulding, electrical testing, inner packaging, and outer packaging to obtain the polyurethane condom product.

The present disclosure is further described in detail by using the examples below.

EXAMPLES

Example 1

The raw materials for the pure polyurethane condom included:
Polyurethane Resin N (100% tensile modulus: 1.2 N/mm$^2$),
High-Strength Polyurethane Resin A (tensile strength: 60 MPa).

A glass mould was cleaned, heated to a surface temperature of 30° C., dipped in the high-strength polyurethane resin A, and oven-dried at 90° C. Then, the resultant was dipped in the polyurethane resin N to a thickness controlled at 2 μm, and oven-dried at 80° C. Then, the resultant was dipped in the high-strength polyurethane resin A and oven-dried at 100° C. After rolling, the product was oven-dried at 120° C., dipped in a release agent, and oven-dried at 80° C., followed by demoulding, electrical testing, inner packaging, and outer packaging to prepare Polyurethane Condom 1 having an ANA layer structure.

Example 2

The raw materials for the pure polyurethane condom included:
Polyurethane Resin N (100% tensile modulus: 1.0 N/mm$^2$),
High-Strength Polyurethane Resin A (tensile strength: 60 MPa),
Low-Modulus Polyurethane Resin B (100% tensile modulus: 1.8 N/mm$^2$),
High-ductility polyurethane Resin C (elongation at break: 700%).

A glass mould was cleaned, heated to a surface temperature of 40° C., dipped in the high-strength polyurethane resin A, and oven-dried at 110° C. Then the resultant was dipped in the polyurethane resin N to a thickness controlled at 1 μm, and oven-dried at 100° C. Then the resultant was dipped in the low-modulus polyurethane resin B and oven-dried at 110° C. Then the resultant was dipped in the polyurethane resin N to a thickness controlled at 1 μm, and oven-dried at 100° C. Then the resultant was dipped in the high-ductility polyurethane resin C and oven-dried at 120° C. After rolling, the product was dried at 140° C., dipped in a release agent, and oven-dried at 80° C., followed by demoulding, electrical testing, inner packaging, and outer packaging to prepare Polyurethane Condom 2 having an ANBC layer structure.

Example 3

The raw materials for the pure polyurethane condom included:
Polyurethane Resin N (100% tensile modulus: 1.0 N/mm$^2$),
Low-Modulus Polyurethane Resin B (100% tensile modulus: 1.8 N/mm$^2$),
High-ductility polyurethane Resin C (elongation at break: 800%),
High Burst-Volume Polyurethane Resin F (burst volume 10 kPa when it is formed into a condom of 20 μm).

A glass mould was cleaned, heated to a surface temperature of 40° C., dipped in the high-ductility polyurethane resin C, and oven-dried at 110° C. Then the resultant was dipped in the polyurethane resin N to a thickness controlled at 5 μm, and oven-dried at 100° C. Then the resultant was dipped in the high-ductility polyurethane resin C and oven-dried at 110° C. Then the resultant was dipped in the polyurethane resin N to a thickness controlled at 5 μm, and oven-dried at 100° C. Then the resultant was dipped in the low-modulus polyurethane resin B and oven-dried at 120° C. Then the resultant was dipped in the high burst-volume polyurethane resin F and oven-dried at 120° C. After rolling, the product was oven-dried at 140° C., dipped in a release agent, and oven-dried at 80° C., followed by demoulding, electrical testing, inner packaging, and outer packaging to prepare Polyurethane Condom 3 having a CNBNCF layer structure.

The above description is merely preferred embodiments of the present disclosure, and is not intended to limit the present disclosure. For a person skilled in the art, the features in the above-described embodiments can be combined with each other as long as there is no conflict, and the present disclosure can also have various modifications and changes. Any modifications, equivalents, improvements, etc. that fall within the spirit and principles of the present disclosure are intended to be included within the scope of the present disclosure. Furthermore, the examples are to be construed as illustrative and not restrictive, while the scope of the present disclosure is defined by the appended claims rather than by the foregoing description. All changes which come within the meaning and range of equivalency of the claims are therefore intended to be included herein. Any reference number used in a claim should not be construed as limiting the claim.

What is claimed is:

1. A pure polyurethane condom having an adhesive layer, comprising:
a first polyurethane film layer;

a polyurethane adhesive layer on the first polyurethane film layer, wherein the polyurethane adhesive layer has a 100% tensile modulus of 2.5 N/mm² or lower;

a second polyurethane film layer on the polyurethane adhesive layer; and a third polyurethane film layer on the second polyurethane film layer; and wherein the first polyurethane film layer and the second polyurethane film layer each have a structure different from that of the polyurethane adhesive layer, and wherein the third polyurethane film layer has a structure different from that of the second polyurethane film layer.

2. The pure polyurethane condom having an adhesive layer according to claim 1, wherein the polyurethane adhesive layer is selected from the group consisting of anionic, cationic, nonionic, and amphoteric waterborne polyurethanes, or solvent-based and solvent-free polyurethanes, and combinations thereof.

3. The pure polyurethane condom having an adhesive layer according to claim 2, wherein the polyurethane adhesive layer is selected from the group consisting of polyether-based, polyester-based, and polyether-polyester hybrid polyurethane resins, and combinations thereof.

4. The pure polyurethane condom having an adhesive layer according to claim 2, wherein the anionic waterborne polyurethane is a carboxylic acid-based polyurethane, a sulfonic acid-based polyurethane, or a mixture of both.

5. The pure polyurethane condom having an adhesive layer according to claim 1, having a thickness of 0.001 mm to 0.04 mm.

6. The pure polyurethane condom having an adhesive layer according to claim 1, having a burst pressure of 1 kPa or more, and/or a burst volume of 5 L or more.

7. The pure polyurethane condom having an adhesive layer according to claim 1, wherein the first polyurethane film layer has a tensile strength of 25 MPa or more.

8. The pure polyurethane condom having an adhesive layer according to claim 1, wherein the first polyurethane film layer has a 100% tensile modulus of 3.5 N/mm² or lower.

9. The pure polyurethane condom having an adhesive layer according to claim 1, wherein the first polyurethane film layer has an elongation at break of 500% or more.

10. The pure polyurethane condom having an adhesive layer according to claim 1, wherein the first polyurethane film layer has a tensile strength retention of 60% or more after being immersed in water at 30° C. to 60° C. for a period of 0.1 h to 1 h.

11. The pure polyurethane condom having an adhesive layer according to claim 1, wherein the first polyurethane film layer has a burst pressure of 1.0 kPa or more when it is formed into a condom of 10-25 µm.

12. The pure polyurethane condom having an adhesive layer according to claim 1, wherein the first polyurethane film layer has a burst volume of 5 L or more when it is formed into a condom of 10-25 µm.

13. The pure polyurethane condom having an adhesive layer according to claim 1, wherein the first polyurethane film layer has a thickness in a range of 0.1 to 20 µm.

14. The pure polyurethane condom having an adhesive layer according to claim 1, comprising at least one polyurethane adhesive layer, and each polyurethane adhesive layer having a thickness of 0.1 to 20 µm.

15. The pure polyurethane condom having an adhesive layer according to claim 1, wherein:
the first polyurethane film layer has a tensile strength of 25 MPa or more;
the second polyurethane film layer has a tensile strength of 25 MPa or more; and
the third polyurethane film layer has a 100% tensile modulus of 3.5 N/mm² or lower.

16. A method for preparing a pure polyurethane condom having an adhesive layer, comprising the steps of:
dipping in a first polyurethane resin and drying, to form a first polyurethane film layer;
dipping in a polyurethane adhesive layer resin and drying, to form a polyurethane adhesive layer on the first polyurethane film layer;
dipping in a second polyurethane resin and drying, to form a second polyurethane film layer on the polyurethane adhesive layer;
dipping in a release agent to apply it on the second polyurethane film layer, followed by drying, demolding, and electrical testing to obtain the polyurethane condom;
wherein the polyurethane adhesive layer has a 100% tensile modulus of 2.5 N/mm² or lower, and the first polyurethane film layer and the second polyurethane film layer each have a structure different from that of the polyurethane adhesive layer.

17. The method for preparing a pure polyurethane condom having an adhesive layer according to claim 16, wherein the dipping in a first polyurethane resin is carried out by dipping a mold composed of glass or a thermoplastic polymer in the first polyurethane resin.

18. A pure polyurethane condom having an adhesive layer, comprising:
a first polyurethane film layer;
a first polyurethane adhesive layer on the first polyurethane film layer;
a second polyurethane film layer on the first polyurethane adhesive layer;
a second polyurethane adhesive layer on the second polyurethane film layer;
a third polyurethane film layer on the second polyurethane adhesive layer; and
a fourth polyurethane film layer on the third polyurethane film layer,
wherein the first polyurethane film layer, the second polyurethane film layer, and the fourth polyurethane film layer each have a structure different from that of the first polyurethane adhesive layer;
wherein the first polyurethane adhesive layer and the second polyurethane adhesive layer have the same structure, and have a 100% tensile modulus of 2.5 N/mm² or lower;
the first polyurethane film layer and the third polyurethane film layer have the same structure, and have an elongation at break of 500% or more;
wherein the second polyurethane film layer has a 100% tensile modulus of 3.5 N/mm² or lower; and
wherein the fourth polyurethane film layer has a burst volume of 5L or more when it is formed into a condom of 10-25 µm.

* * * * *